United States Patent Office 3,068,067
Patented Dec. 11, 1962

3,068,067
PROCESS OF PREPARING LUMINESCENT GRADE DIBASIC CALCIUM PHOSPHATE
Michael A. Aia, Towanda, Pa., assignor to Sylvania Electric Products Inc., a corporation of Delaware
No Drawing. Filed May 20, 1960, Ser. No. 30,417
7 Claims. (Cl. 23—109)

This invention relates to increasing the efficiency of phosphate phosphors by control of the raw materials used in their preparation, and to methods of preparing raw materials to give such improved efficiency. The invention is especially concerned with the dibasic calcium phosphate used in preparing phosphate phosphors.

The purity and particle size of the raw materials, such as dibasic calcium phosphate, used in preparing phosphors are much more critical than if they were used in making agricultural fertilizers and even more critical than if they were used in pharmaceuticals. Even for the latter use, substantial impurities such as iron, magnesium and sodium would be acceptable, but they would be very damaging if the materials were used in making phosphors. Luminescent grade dibasic calcium phosphate ($CaHPO_4$) should not contain more than 30 parts per million (p.p.m.) of total heavy metal impurity, while the magnesium content should be less than 10 p.p.m., and the sodium content less than about 100 to 200 p.p.m. These stringent requirements limit the variety of methods which can be used in preparing $CaHPO_4$ for phosphor use, and yet the particle size of the material must also fall within a narrow range.

The same problem exists also in the preparation of dibasic strontium phosphate ($SrHPO_4$) and dibasic barium phosphate ($BaHPO_4$) for phosphor use.

Increased raw material efficiency as well as improved brightness when the phosphor is used in lamps requires the use of a dibasic phosphate of a narrow particle size distribution during synthesis of the phosphor. The direct production of the dibasic phosphate raw material with proper particle size makes unnecessary any later separation of proper size from a material of a wide range of sizes, and results in making a larger proportion of the material useful in the manufacture of phosphors.

Dibasic calcium phosphate for use in phosphor preparation have previously been made by precipitation from diammonium phosphate, $(NH_4)_2HPO_4$ with calcium chloride, $CaCl_2$.

I have found, however, that preparation from a combination of mono-ammonium phosphate ($NH_4H_2PO_4$) with ammonia ($NH_3$) and calcium chloride ($CaCl_2$) produces a better material for phosphor work, fulfilling the requirements already stated. Moreover, the precipitation with those ingredients can be carried out at room temperature, say 20° C. to 30° C., without requiring the higher temperature of 65° C. to 95° C. needed for the diammonium phosphate. By using a suitable salt of barium or strontium instead of the calcium chloride, dibasic strontium phosphate or dibasic barium phosphate may be precipitated instead. Other salts than the chloride can be used, for example the nitrates of Ca, Sr or Ba, if desired. The salt should be one which will not leave a solid or liquid residue of impurities in the phosphor. The excess materials in the nitrates go off as gases, that is as oxygen and nitrogen.

My process gives a high bulk density material, and such a property is very effective in the use of the material in phosphors.

EXAMPLE 1

A specific example of the preparation is given below, the raw materials used being as follows:

| Raw Material | Mol Ratio | Grams per mol $CaHPO_4$ |
|---|---|---|
| $CaCl_2$ | 1.00 | 111 (anhydrous). |
| $NH_4H_2PO_4$ (MAP) | 1.00 | 115. |
| $NH_4OH$ (28% $NH_3$) | 1.00 | 17 ($NH_3$). |

To a liter of 1 M solution of $CaCl_2$ add one liter of a 1-molar solution of mono-ammonium phosphate at room temperature with stirring. About 5% of the theoretical $CaHPO_4$ will be precipitated as $CaHPO_4.2H_2O$. This precipitate may be discarded after filtering, since it contains much of the impurities originally in solution. To the filtrate slowly add, with rapid stirring, one gram-mol of $NH_3$ (as $NH_4OH$). Additional $CaHPO_4.2H_2O$ precipitates with the addition of $NH_3$, to the extent of about 93% of theoretical in small-scale tests. This precipitate is very crystalline and uniform if localized excesses of $NH_3$ addition are avoided during precipitation. The pH during the $NH_3$ addition should be maintained below 5.0 at all times. The precipitate is then washed free of chloride with cold deionized water (hot water can cause the product to convert to calcium hydroxylapatite). Oven drying at 180–200° follows to convert $CaHPO_4.2H_2O$ to $CaHPO_4$, with little change in crystal habit. Vacuum drying at lower temperatures may also be employed. For convenience, the expression "1 M" is used herein to mean "1-molar," that is a 1 M solution is a 1-molar solution, namely, a solution of one mole of substance in one liter of solution.

EXAMPLE 2

A better way of adding the ammonia required for efficient precipitation is to incorporate the $NH_3$ of Example 1 with the $CaCl_2$ and add this ammoniacal $CaCl_2$ to purified mono-ammonium phosphate solution. Thus, one gram-mol of $NH_3$ (67.4 ml. of 28% $NH_4OH$) is added to one gram-mol of $CaCl_2$ and the volume then brought to 1000 ml. This solution (1 M in $NH_3$ and 1 M in $CaCl_2$) is added slowly at room temperature to 1000 ml. of 1 M MAP solution. This method is better in that the pH remains virtually constant (pH 4.0±.2) and localized excesses of $NH_3$ are avoided. The product is $CaHPO_4.2H_2O$ which is washed and dried as in Example 1 above to obtain anhydrous $CaHPO_4$.

EXAMPLE 3

Precipitates of closer size range with less agglomeration are obtained if the ratio of Ca/P in the precipitating solutions is maintained at about 3Ca/1P. Hence, it is preferred to prepare an ammoniacal $CaCl_2$ solution which is about 3 M in $CaCl_2$ and 3 M in $NH_3$ and add this slowly to purified 1 M mono-ammonium phosphate at room temperature. Again, the product is pure $CaHPO_4.2H_2O$ of excellent crystallinity and uniformity. This is washed and dried as in Example 1 above to obtain anhydrous $CaHPO_4$.

These examples show particular embodiments of my invention. It is obvious that other calcium salts may be employed, such as the nitrate, acetate, formate, etc. Similarly, mono-ammonium phosphate may be prepared by adding $NH_3$ to phosphoric acid.

| | Phosphoric Acid | Mono-ammonium Phosphate |
|---|---|---|
| (1) | $H_3PO_4+NH_4OH$ (pH 0.5) | $NH_4H_2PO_4+H_2O$ (pH 4.0). | or by the addition of an acid to diammonium phosphate:

|  | Diammonium Phosphate | Mono-ammonium Phosphate |
|---|---|---|
| (2) | $(NH_4)_2HPO_4 + HCl$ (pH 8.0). | $NH_4H_2PO_4 + NH_4Cl$ (pH 4.0). |

Thus it may be stated that it is best to define "mono-ammonium phosphate" as the ammonium salt of phosphoric acid which exists in aqueous solution from about pH 3 to about pH 5.

Soluble salts of Sr and Ba may be used in replacement of the $CaCl_2$ of Examples 1–3 to obtain dense precipitates of $SrHPO_4$ of $BaHPO_4$, also useful in phosphor preparations.

The crystal structure and physical properties of the precipitates are known to be a function of temperature. The data of Table I are given in summary:

Table I

COMPARISON OF STRUCTURE AND PHYSICAL PROPERTIES OF $CaHPO_4$, $SrHPO_4$ AND $BaHPO_4$ MADE FROM $NH_4H_2PO_4$-$MeCl_2$-$NH_4OH$ AT 30° AND 70°C. (Me=Ca, Sr, or Ba)

| System | Material Pptd. (X-Ray) | Microscopic Crystallinity | Bulk Density (g./in.³) | Fisher SSS |
|---|---|---|---|---|
| Ca—30° C | $CaHPO_4 \cdot 2H_2O$ | 1–2 | 4.80 | 5.2 |
| Ca—70° C | $CaHPO_4$ | 5 | 5.32 | 4.1 |
| Sr—30° C | $\alpha+\beta$—$SrHPO_4$ | 4 | 11.20 | 10.8 |
| Sr—70° C | $\alpha$—$SrHPO_4$ | 5 | 4.30 | 1.2 |
| Ba—30° C | $BaHPO_4$ | 1–2 | 15.38 | 18.0 |
| Ba—70° C | $BaHPO_4$ | 1–2 | 15.84 | 20.0 |

The microscopic crystallinity is given in arbitrary but relative units in a scale on which 1 is best and 5 is poorest.

It is evident that no advantage in properties is gained at the higher temperatures. Furthermore, testing has shown that larger amounts of $NH_3$ are required above room temperature due to losses by volatilization.

Phosphors used in lamps made according to my method have given from about 1 to 2 lumens per watt gain in efficiency over those made by using the diammonium phosphate. The gain was secured with di-calcium phosphate precipitated at room temperature that is between about 20° C. and about 30° C. Temperatures up to about 60° C. can be used effectively, but at higher temperatures the gain drops off, becoming an actual loss of as much as 2 LPW when precipitated at 90° C. and used in lamps of so-called 3500° K. color temperature.

What I claim is:

1. The process of preparing luminescent grade dibasic alkaline-earth phosphates, said process comprising adding a solution of a salt, selected from the group consisting of the chlorides and nitrates of an alkaline-earth metal selected from the group consisting of barium, strontium and calcium, to a solution of mono-ammonium phosphate in the presence of ammonia to precipitate the dibasic phosphate while keeping the pH of the solution below 5, and recovering the dibasic earth phosphates.

2. The process of preparing luminescent grade dibasic calcium phosphate which comprises the steps of adding an ammmoniacal solution of calcium chloride to a solution of a mono-ammonium phosphate to precipitate dibasic calcium phosphate therefrom while keeping the pH of the resultant solution at about 4.

3. The process of claim 2, in which the ratio of calcium to phosphorus in the precipitating solutions is 3 to 1.

4. The process of claim 2, in which the temperature of the precipitating solution is from 10° C. to 50° C.

5. The process of claim 4, and the further step of drying the precipitate in vacuum at 100° C. to 150° C. to dehydrate the same while maintaining its crystalline integrity.

6. The process of claim 4, and the further step of air drying at a temperature between about 180° C. to 200° C. to dehydrate the same while maintaining its crystalline integrity.

7. The process of preparing a luminescent grade dibasic calcium phosphate, which process comprises adding, at room temperature, to a solution of calcium chloride and ammonia, a quantity of mono-ammonium phosphate to form a precipitate of calcium di-ortho phosphate while maintaining the pH of the solution substantially constant at about 4.0, washing the precipitate, and drying the same to obtain the anhydrous calcium di-ortho phosphate.

References Cited in the file of this patent

UNITED STATES PATENTS 2,946,656   Schreurs _____ July 26, 1960